United States Patent
Stärk et al.

(10) Patent No.: US 11,051,489 B2
(45) Date of Patent: Jul. 6, 2021

(54) APPARATUS, LIQUID RESERVOIR, SYSTEM, AND USE OF A LIQUID RESERVOIR FOR ELECTROLESSLY SPRINKLING ANIMAL FEED

(71) Applicant: EW Nutrition GmbH, Visbek (DE)

(72) Inventors: Friedrich Stärk, Damme (DE); Jan Wesjohann, Visbek (DE); Heinrich Kleine Klausing, Lohne (DE); Timo Rothstein, Kierspe (DE)

(73) Assignee: EW NUTRITION GMBH, Visbek (DE)

( * ) Notice: Subject to any disclaimer, the term of this patent is extended or adjusted under 35 U.S.C. 154(b) by 403 days.

(21) Appl. No.: 16/303,823

(22) PCT Filed: May 23, 2017

(86) PCT No.: PCT/EP2017/062475
§ 371 (c)(1),
(2) Date: Nov. 21, 2018

(87) PCT Pub. No.: WO2017/202875
PCT Pub. Date: Nov. 30, 2017

(65) Prior Publication Data
US 2020/0170218 A1    Jun. 4, 2020

(30) Foreign Application Priority Data
May 25, 2016    (EP) .................................... 16171249

(51) Int. Cl.
*A01K 5/02*    (2006.01)
*A01K 39/012*    (2006.01)

(52) U.S. Cl.
CPC .......... *A01K 5/0275* (2013.01); *A01K 5/0225* (2013.01); *A01K 5/0208* (2013.01);
(Continued)

(58) Field of Classification Search
CPC .. A01K 5/0258; A01K 5/0225; A01K 5/0275; A01K 5/0208; A01K 5/0216; A01K 5/0291; A01K 39/012; A01K 7/02
See application file for complete search history.

(56) References Cited

U.S. PATENT DOCUMENTS

| 3,196,835 A | 7/1965 | Bergevin |
| 3,433,205 A * | 3/1969 | Pittard .................. A01K 39/01 119/51.11 |

(Continued)

FOREIGN PATENT DOCUMENTS

| CN | 201846674 U | 6/2011 |
| CN | 203290048 U | 11/2013 |

(Continued)

OTHER PUBLICATIONS

Office Action for Russian Patent Application No. 2018145751/10(076494), dated Sep. 28, 2020, 13 pages.
(Continued)

*Primary Examiner* — Ebony E Evans
(74) *Attorney, Agent, or Firm* — Westman, Champlin & Koehler, P.A.

(57) ABSTRACT

The present invention relates to an apparatus for electrolessly sprinkling animal feed. The apparatus comprises a housing, a mount for a liquid reservoir with a mechanically actuatable spray head, and a transmission element. The transmission element is movably mounted in the housings and configured to be moved by a conveying system. The transmission element comprises a section actuating the spray head, said section being configured to transmit movement of the transmission element to the spray head. The invention further relates to a liquid reservoir, a system, and a use of the liquid reservoir.

34 Claims, 11 Drawing Sheets

(52) U.S. Cl.
CPC .......... *A01K 5/0216* (2013.01); *A01K 5/0291* (2013.01); *A01K 39/012* (2013.01)

(56) References Cited

U.S. PATENT DOCUMENTS

| | | | | |
|---|---|---|---|---|
| 3,437,075 A * | 4/1969 | Hawes, Jr. | ............ | A01K 5/0216 119/57.2 |
| 3,556,057 A * | 1/1971 | Icking | .................. | A01K 5/0275 119/51.5 |
| 4,301,768 A * | 11/1981 | Osborn | .................. | B65G 19/14 119/51.11 |
| 5,129,361 A * | 7/1992 | Deutsch | ............... | A01K 5/0291 119/51.12 |
| 8,640,861 B2 * | 2/2014 | Chellberp et al. | ..... | B65G 23/44 198/813 |
| 2020/0068814 A1 * | 3/2020 | McGloin | ................ | B65G 65/40 |

FOREIGN PATENT DOCUMENTS

| | | |
|---|---|---|
| CN | 104886732 A | 9/2015 |
| DE | 2 359 390 B1 | 9/1974 |
| DE | 42 33 919 A1 | 4/1994 |
| EP | 2 526 763 A2 | 11/2012 |
| FR | 2 963 781 A1 | 2/2012 |
| RU | 2 055 325 C1 | 2/1996 |
| SU | 582842 A1 | 12/1977 |
| SU | 865235 A1 | 9/1981 |
| SU | 1364273 A1 | 1/1988 |

OTHER PUBLICATIONS

Russian Search Report for Russian Patent Application No. 2018145751/10(076494), dated Sep. 23, 2020, 4 pages.
Extended European search report for European Patent Application No. 16171249.2, dated Sep. 12, 2016, 10 pages.
International Preliminary Report on Patentability for International Application No. PCT/EP2017/062475, dated Nov. 27, 2018, 18 pages.
Office Action, including search report, for Chinese Patent Application No. 201780031748.X, dated Dec. 2, 2020, 27 pages.
International Search Report (including English translation) and Written Opinion for International Application No. PCT/EP2017/062475, dated Aug. 30, 2017, 13 pages.

* cited by examiner

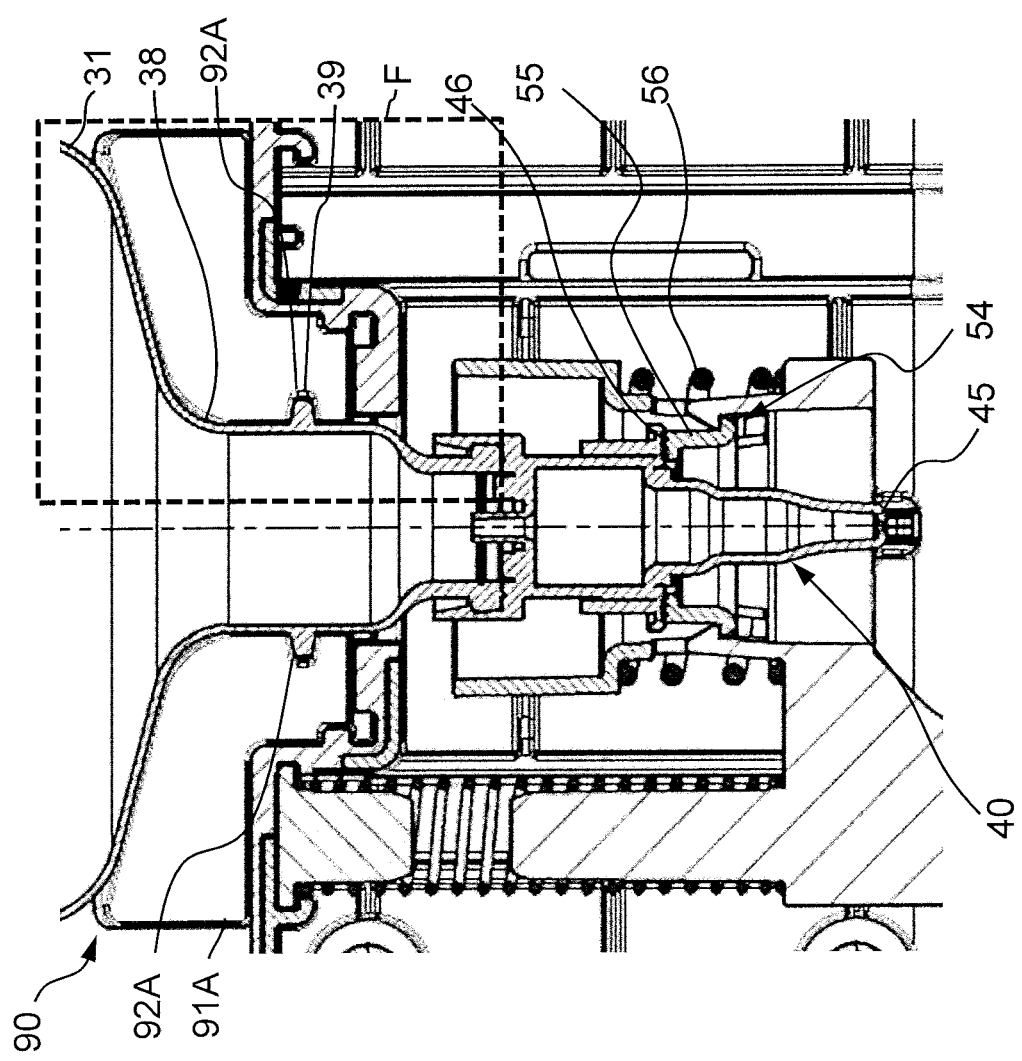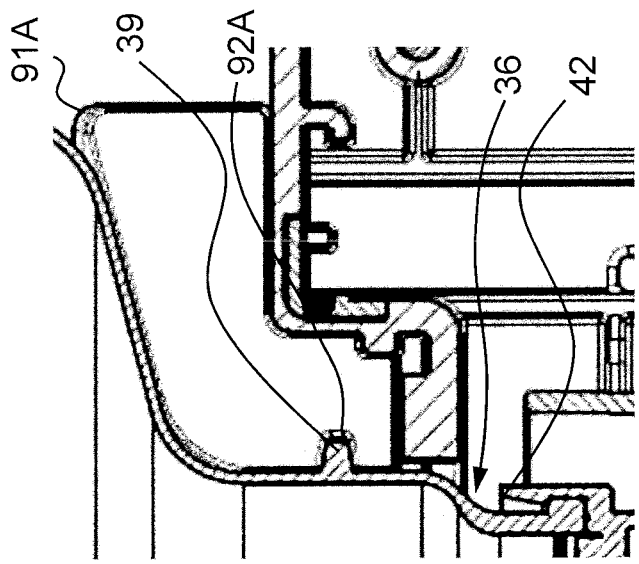

APPARATUS, LIQUID RESERVOIR, SYSTEM, AND USE OF A LIQUID RESERVOIR FOR ELECTROLESSLY SPRINKLING ANIMAL FEED

CROSS-REFERENCE TO RELATED APPLICATION

This Application is a Section 371 National Stage Application of International Application No. PCT/EP2017/062475, filed 23 May 2017 and published as WO 2017/202875 A1 on 30 Nov. 2017, in German, the contents of which are hereby incorporated by reference in their entirety.

The present invention relates to apparatuses, liquid reservoirs, systems and methods allowing for adding pharmaceuticals, forage additives, and/or further supplementary products authorized under pharmaceutical and/or feed law to animal feed. The invention is particularly directed to such apparatuses, liquid reservoirs, systems and methods by means of which pharmaceuticals, forage additives, and/or further supplementary products authorized under pharmaceutical and/or feed law may be dispensed without having to provide additional electricity supply for the dispensing apparatus.

In animal husbandry, in particular with respect to farm animals such as laying hens, broilers, or pigs, it may be desirable to add feed additives authorized under pharmaceutical and/or feed law, e.g., pharmaceuticals (including vaccines and anthelmintic therapy), and/or forage additives to animal feed. Substantial automation of the process of supplying such pharmaceuticals, forage additives, and/or further supplementary products authorized under pharmaceutical and/or feed law is desirable for cost reasons.

The use of dosing devices which introduce pharmaceuticals into the drinking water of the animals may lead to said animals refusing to ingest the drinking water when the added pharmaceuticals change the taste of the drinking water. Since the drinking water is usually not consumed to the full, incorrect dosing and non-negligible losses of pharmaceuticals, forage additives, and/or further supplementary products authorized under pharmaceutical and/or feed law may occur, which entails cost disadvantages.

CN 104 88 6732 A discloses an apparatus for supplying small amounts of liquid, said apparatus comprising a dosing pump and a control connected thereto. Such apparatuses require electricity supply in order to operate the pump and the control. This involves limitations with respect to potential mounting sites, and increases the mounting effort. The complexity of such active supply systems leads to high cost.

DE 42 33 919 A1 discloses a medicator for dry feed which introduces medicaments from a storage into a continuous feed flow. Pulses for dispensing metered quantities of the medicament are derived from a conveying member of a feed transport system. However, the apparatus is only suitable for introducing powdered medicaments. The concentration of the medicament may vary along the length of the conveyor. Such a variance may involve disadvantages when it comes to the treatment of the farm animals.

EP 2 526 763 A2 discloses a poultry trough feeding system comprising a dry feed inlet and a liquid inlet. The liquid inlet is a liquid feed inlet having an outflow opening with a minimum cross-sectional dimension of at least 5 mm and/or a with a cross-sectional area of at least 20 mm$^2$ through which the liquid feed flows out.

DE 23 59 390 B1 discloses a dosing device for bulk material.

It is thus an object of the present invention to provide an apparatus, a liquid reservoir, a system and a method which allow for evenly applying or introducing pharmaceuticals, forage additives, and/or further supplementary products authorized under pharmaceutical and/or feed law to animal feed in a simple and safe manner.

These and further objects are achieved with an apparatus, a liquid reservoir, a system, and a method as described in the independent claims. Further preferred embodiments are defined in the dependent claims.

Accordingly, the present invention provides an apparatus, a liquid reservoir, a system, and a method allowing for sprinkling animal feed with metered quantities of a liquid. In this context, said liquid may comprise one or more of a pharmaceutical, a forage additive, and/or further supplementary products authorized under pharmaceutical and/or feed law. The process of sprinkling may be carried out in portions by means of actuating a spray head. The energy required for actuating the spray head may be derived from the movement of a conveying member of a conveying system for the animal feed via a transmission mechanism.

An apparatus according to the invention is configured to electrolessly sprinkle animal feed, particularly dry feed, with pharmaceuticals, forage additives, and/or further supplementary products authorized under pharmaceutical and/or feed law. Here, the term of electroless operation involves that the apparatus does not have to be separately supplied with electrical energy in order to dispense a portion of liquid from the liquid reservoir. The conveyor of the conveying system separate from the apparatus may still be electrically powered, wherein the electrical connections of the conveyor may be spaced apart from the apparatus according to the invention, and the apparatus itself does not have to comprise an electrically conductive connection with an electricity source.

The apparatus according to the invention comprises a housing, a mount for a liquid reservoir with a spray head that can be actuated mechanically, and a transmission element. The transmission element is movably mounted in the housing. The transmission element is configured such that it may be moved through the conveying system. The transmission element may comprise a section for actuating the spray head, wherein said section is configured to transmit movement of the transmission element to the spray head.

The apparatus according to the invention allows for relatively evenly applying or introducing one or more of a pharmaceutical, a forage additive, and/or further supplementary products authorized under pharmaceutical and/or feed law to the animal feed since the apparatus according to the invention may actuate a spray head for said application or introduction step. Furthermore, the apparatus according to the invention operates electrolessly such that the movement necessary for actuating the spray head is derived from the movement of the transmission element caused by the conveying system. Accordingly, the electroless operation of the apparatus allows for the apparatus to be mounted to a plurality of different positions at the conveying system with ease and little mounting effort.

The transmission element may preferably be configured so as to operatively cooperate with a chain of a chain conveyor. Alternatively or additionally, the transmission element may be preferably configured so as to operatively cooperate with a spiral of a spiral conveyor. The transmission element may preferably be configured so as to operatively cooperate with carriers on a cable conveyor. Accordingly, the apparatus according to the invention may be deployed with a plurality of different conveying members.

The transmission element may comprise a section with a bearing surface actuated by the conveying system during operation, said bearing surface being configured for coupling with the conveying member of the conveying system. The bearing surface may be configured to be inclined relative to a direction which, in the mounted state of the apparatus according to the invention, corresponds to the conveying direction of the conveying system. In this way, a pulsed movement of the transmission element may particularly easily be generated in a direction transverse to the conveying direction, in particular substantially perpendicular to the conveying direction, from a movement of the conveying member by means of which animal feed is conveyed in the conveying direction.

The transmission element may preferably comprise sections of different materials. The transmission element may comprise an actuated section which comes into contact with the conveying member of the conveying system in the mounted state of the apparatus. The actuated first section may be a metallic section. The transmission element may comprise a second section which does not come into contact with the conveying member of the conveying system. The second section may be made of plastic. The transmission element may be configured such that the first section is encapsulated with the second section. Alternatively, the first section may be mounted to the second plastic section in a different manner.

The first section may have a higher strength than the second section. The first section may be configured as a contoured metal skid which may with low wear be in abutting contact with the conveying member of the conveying system sliding along the metal skid.

Preferably, the transmission element may be translationally movably mounted in the housing. The transmission element may preferably be mounted in the housing such that its translational trajectory is inclined relative to the conveying direction of the conveying system.

The transmission element may be mounted in the housing via a linear guide. The linear guide may preferably be a linear sliding guide, particularly a linear sliding guide with at least one tongue section and at least one groove section. Thus, particularly safe guidance of the transmission element for actuating the spray head is achieved. The transmission element may comprise two tongue sections cooperating with two groove sections formed at opposing inner surfaces of the housing. The transmission element may comprise two groove sections cooperating with two tongue sections formed at opposing inner surfaces of the housing.

The transmission element may be displaceable within the housing via the linear guide substantially transversely to the conveying direction of the conveying system. The housing may comprise a conduit in which a wall of the conveying system can be received. The transmission element may be displaceable within the housing via the linear guide perpendicularly or substantially perpendicularly to a longitudinal axis of the conduit of the housing. In this way, an automated stroke movement for actuating the spray head may particularly easily be generated, wherein during operation of the apparatus the stroke movement may preferably be directed substantially transversely to the conveying direction of the conveying system.

The transmission element may preferably be mounted in the housing such that the actuating section moves substantially linearly. In doing so, the use of the apparatus according to the invention in combination with spray heads being actuatable by means of substantially linear movement is simplified.

During operation, the transmission element may be in direct contact with an actuating section of the spray head. It may, however, be preferable to couple the transmission element with the actuating section of the spray head via at least one intermediate member in order to allow for, e.g., reliable actuation of the spray head also for tilted liquid reservoirs.

The actuating section may preferably comprise a pressure element movably coupled with the transmission element. Preferably, the movement of the transmission element may be transmissible to an actuating section of the spray head via the pressure element. The use of a pressure element which is movable relative to the transmission element and has play allows for safe actuation of the spray head even when the spray head is not held precisely centered at the housing and/or at an angle relative to its set alignment.

A compensating element may be arranged between the transmission element and the pressure element. The compensating element may preferably be elastic. The compensating element may, e.g., be a coil spring or comprise a coil spring. The compensating element may preferably be configured so as to allow for tilting and/or displacing of the pressure element relative to the transmission element. In this way, safe actuation of the spray head may preferably be ensured even when the spray head is not held precisely centered at the housing and/or at an angle relative to its set alignment.

Preferably, the apparatus may further comprise an elastic return element which is deformed by means of the conveying system upon actuation of the transmission element and which then urges the transmission element back to its initial position. The elastic return element may preferably be a coil spring or another resilient member. With the help of the return element, the transmission element may quickly be returned to its initial position and/or be in abutting contact with the conveying member. In this context, the return element may particularly be configured such that after deflection for actuating the spray head the transmission element is returned into its initial position within the specific period of time in which the successive chain link of a chain conveyor, a spiral channel of a spiral conveyor, or a successive carrier of a cable conveyor reaches the transmission element again. It may thus be ensured that the spray head is actuated with quick pulsing that is adapted to suit the conveying member. Accordingly, one may achieve a particularly low variance of the pharmaceutical, forage additive, and/or further supplementary product authorized under pharmaceutical and/or feed law that is applied or introduced to the animal feed.

The housing may comprise a first housing part and a second housing part. The first housing part and the second housing part may be reversibly detachably connectable with each other. The housing may preferably be configured such that it is mountable on the wall of the conveying system. In this context, the first housing part and the second housing part may preferably be configured such that together they engage around a wall of the conveying system. In a preferable manner, such a configuration allows for particularly easy mounting of the apparatus to a plurality of positions due to the fact that the housing parts are mounted to the wall of the conveying system from opposite sides and are connected to each other. A conduit defined in the housing may comprise a shoulder which abuts the wall of the conveying system in a form-fit manner in the mounted state of the housing.

The first housing part may be a first housing half, and the second housing part may be a second housing half.

The housing may comprise a blender. The blender may be positioned so as to stir the animal feed in the conveying direction downstream from the position at which the spray head sprinkles the animal feed.

The mount of the apparatus may preferably be configured so as to at least partially engage around the spray head and/or a container of the liquid reservoir. The mount of the apparatus may preferably be configured so as to hold a container and/or the spray head of the liquid reservoir in a form fit. Thus, the mount may serve as an abutment when an actuation section of the spray head of the apparatus is actuated during operation.

The mount of the apparatus may preferably comprise one or more projections which at least sectionally extend around the spray head and/or a container of the liquid reservoir. The apparatus may preferably comprise at least one engagement portion for form-fit engagement with a corresponding engagement portion of the liquid reservoir. For instance, a projection may be formed at a neck of the container of the liquid reservoir, wherein said projection partially or completely surrounds the neck in its circumferential direction. Accordingly, the mount of the apparatus may comprise a corresponding cavity configured to receive the projection. In this manner, the liquid reservoir may be held by the mount by means of a tongue-and-groove joint.

The mount of the apparatus may comprise a first mounting element and a second mounting element. The first mounting element and the second mounting element may be movable relative to the housing when in a state in which the liquid reservoir is mounted to the apparatus in order to allow for insertion of the liquid reservoir into an opening formed by the first mounting element and the second mounting element. Preferably, the first mounting element and the second mounting element may be guided at the housing, e.g., by means of a guide rail.

The apparatus may comprise at least one locking element for locking the first mounting element and/or the second mounting element. The apparatus may comprise a first locking element for locking the first mounting element. The first locking element may be rotatably, pivotably, or slidably mounted to the housing. The apparatus may comprise a second locking element for locking the second mounting element. The second locking element may be rotatably, pivotably, or slidably mounted to the housing. Such a configuration preferably allows for securing the first mounting element and the second mounting element in a position in which they at least partially engage around a liquid reservoir and protect the same from axial movement along an axis of the liquid reservoir.

The apparatus may comprise a locking mechanism by means of which the transmission element is locked in a position in which it does not come into contact with the conveying member of the conveying system. Preferably, the apparatus may temporarily be put out of operation in this way, e.g., in order to interrupt the supply of the pharmaceutical, the forage additive, and/or further supplementary products authorized under pharmaceutical and/or feed law. The locking mechanism may comprise at least one pin or another detent in order to secure the transmission element in a position at which it remains spaced apart from the conveying member of the conveying system.

The apparatus may be configured to actuate the spray head for discontinuous dispensing of the product. The dispensed product may comprise a pharmaceutical, a forage additive, and/or further supplementary products authorized under pharmaceutical and/or feed law. The discontinuous dispensing of products may take place in puffs, wherein each puff may be caused by a single actuation of the spray head invoked by the transmission element.

A liquid reservoir according to the invention for sprinkling animal feed comprises a container and a mechanically actuatable spray head. The container contains a pharmaceutical, a forage additive, and/or a further supplementary product authorized under pharmaceutical and/or feed law. The container may preferably comprise an engagement portion for reversibly detachably coupling the liquid reservoir in a form-fit manner with an apparatus for electrolessly sprinkling animal feed.

The liquid reservoir according to the invention allows for evenly applying or introducing one or more additives authorized under pharmaceutical and/or feed law to the animal feed since a spray head is mechanically actuated for the process of application or introduction. The liquid reservoir is configured such that it may be non-destructively releasably mounted to and detached from an apparatus according to the invention. The engagement portion, which is provided at the container and preferably spaced apart from the spray head, facilitates fastening of the container such that the apparatus may move an actuation section of the spray head relative to the container in a translational, particularly linear, manner.

The engagement portion of the container may preferably comprise a projection which at least partially surrounds a part of the container annularly in a circumferential direction. The engagement portion may comprise a recess which at least partially surrounds a part of the container annularly in a circumferential direction. Such a configuration makes it possible to hold the container at the apparatus according to the principle of a tongue-and-groove joint and protect it against undesired movement when the spray head is actuated by the apparatus.

The container may hold a liquid volume of at least 0.25 liters. The container may particularly hold a liquid volume of at least 0.5 liters, particularly of at least 1.0 liters, particularly of at least 1.5 liters. Containers with different inner volumes may be used. In this context, the inner volume of the container may, e.g., be selected depending on the respective use.

The spray head may comprise a mechanically actuatable dosing pump. The spray head may comprise a nozzle in order to dispense a respective amount of liquid in a spray cone. Accordingly, an opening angle of the cone may be selected such that a diameter of the amount of liquid dispensed by the liquid reservoir is substantially at least equal to a distance between chain links of the chain conveyor, a pitch of the spiral conveyor, or a distance between carriers of the cable conveyor when impinging on the conveyed animal feed.

The liquid reservoir may be configured for discontinuous product dispensing. The dispensed product may comprise a pharmaceutical, a forage additive, and/or further supplementary products authorized under pharmaceutical and/or feed law. The discontinuous dispensing of products may take place in puffs, wherein each puff may be caused by a single actuation of the spray head.

The liquid reservoir may be configured to influence an internal pressure of the container during or after actuation of the spray head. For this purpose, the liquid reservoir may comprise a pressure compensation mechanism. Said pressure compensation mechanism may comprise a valve that allows for a gas to stream into the container during or after actuation of the spray head. The pressure compensation mechanism may alternatively or additionally comprise an opening in the container allowing for a gas to stream into the container during or after actuation of the spray head. The container may comprise a weak spot for creating the opening in the container.

As an alternative or in addition, the container of the liquid reservoir may be compressible or comprise a compressible chamber. During or after actuation of the spray head, the container or the compressible chamber may be compressed under the influence of ambient pressure or by means of pressure that is actively applied by the apparatus in order to reduce the internal volume of the container or the compressible chamber. For instance, the liquid reservoir may comprise a tubular bag as a container. The internal volume of the container or the compressible chamber may be reduced corresponding to the amount of liquid that has been dispensed in total since the start of the use of the liquid reservoir.

A system according to the invention is configured for sprinkling animal feed, particularly dry feed, with pharmaceuticals, forage additives, and/or further supplementary products authorized under pharmaceutical and/or feed law in a conveying system. The system comprises an apparatus according to an embodiment. The system may preferably comprise a container for a liquid containing a pharmaceutical, a forage additive, and/or a further supplementary product authorized under pharmaceutical and/or feed law. The system may comprise a mechanically actuatable spray head.

The liquid may contain the pharmaceutical, the forage additive, and/or the further supplementary product authorized under pharmaceutical and/or feed law in liquid form or in a solution, e.g., a water solution. The product contained in the liquid reservoir may also be an emulsion or a suspension.

The system according to the invention allows for relatively evenly applying or introducing one or more additives authorized under pharmaceutical and/or feed law to the animal feed since a spray head is mechanically actuated for the process of application or introduction. The mechanical actuation takes place in an electroless manner because the movement for actuating the spray head is derived from the movement of the transmission element caused by the conveying system, as has been described in connection with the apparatus of the invention.

The spray head may preferably comprise an actuation section which operatively cooperates with the actuating section of the transmission element. In particular, the actuation section may operatively cooperate with the pressure element of the actuating section of the apparatus.

The actuation section may preferably be guided linearly at the spray head. The spray head may be configured such that a puff is triggerable by means of substantially linear displacement of the actuation section. This allows for sprinkling the animal feed using spray heads with easy design which are triggerable by means of linear displacement of the actuation section. The spray head may comprise a dosing pump actuatable by linear movement of the actuation section.

The container may comprise an engagement portion engaging with a corresponding engagement portion of the apparatus. The engagement portion of the container may preferably be configured such that the container may be held by the apparatus in a form fit.

The mount of the apparatus may preferably be configured so as to prevent the spray head from yielding when the actuation section is actuated by the actuating section of the transmission element. For this purpose, the mount may preferably engage around an engagement portion of the liquid reservoir. For instance, a projection may be formed at a neck of a container of the liquid reservoir, said projection partially or completely surrounding the neck annularly in a circumferential direction. Accordingly, the mount may comprise a corresponding cavity which is configured to receive the projection. In this way, the liquid reservoir may be held by the mount with the help of a tongue-and-groove joint. The mount may easily apply a counterforce acting on the container and serve as an abutment when the actuation section of the spray head is actuated by the apparatus.

The container and the spray head of the system may form a liquid reservoir according to the invention. The liquid reservoir may be non-destructively releasably detachable from the apparatus, e.g., in order to allow for replacement of the liquid reservoir as soon as the liquid reservoir is almost or completely empty or in case replacement thereof is desired for other reasons.

The system may comprise a conveying system for animal feed. The apparatus may in this context be mounted on a wall of the conveying system such that the transmission element is actuatable by a conveying member of the conveying system.

The system may comprise a feed reservoir for dry feed. The conveying system may be coupled with the feed reservoir and configured to convey dry feed from the reservoir.

The system may be configured such that the spray head is actuated for discontinuous product dispensing. The dispensed product may comprise a pharmaceutical, a forage additive, and/or a further supplementary product authorized under pharmaceutical and/or feed law. The discontinuous dispensing of products may take place in puffs, wherein each puff may be caused by actuation of the spray head invoked by the transmission element.

In a use according to the invention, a liquid reservoir filled with a pharmaceutical, a forage additive, and/or further supplementary products authorized under pharmaceutical and/or feed law and comprising a mechanically actuatable spray head is used for sprinkling animal feed, particularly dry feed, in an automated conveying system.

The use according to the invention allows for relatively evenly applying or introducing one or more additives authorized under pharmaceutical and/or feed law to the animal feed since a spray head is mechanically actuated for the process of application or introduction.

When using the liquid reservoir, the liquid reservoir may be coupled with an apparatus according to the invention. The conveying system may be operated. In doing so, the liquid is dispensed in portions by means of actuation of the spray head by the apparatus.

The liquid reservoir may be replaced. Replacement may take place when no further sprinkling of the animal feed is desired. Replacement may also take place when the liquid reservoir is completely or substantially empty.

The container of the liquid reservoir may hold a liquid volume of at least 0.25 liters. The internal volume may preferably hold 1.5 liters. Containers with different internal volumes may be used. In this context, the internal volume of the container may be selected, e.g., depending on the respective use.

When using the liquid reservoir, the product may be dispensed discontinuously, particularly in puffs. The dispensed product may comprise a pharmaceutical, a forage additive, and/or further supplementary products authorized under pharmaceutical and/or feed law.

The apparatus according to the invention, the liquid reservoir according to the invention, the system according to the invention, and the use according to the invention may be configured such that an amount of liquid of up to 500 µl is dispensed per puff. The amount of liquid dispensed per puff may be greater than or equal to 20 µl and smaller than or equal to 500 µl. The amount of liquid dispensed per puff may be smaller than 100 µl or smaller than 50 µl, e.g., 20 µl to 100 or 20 µl to 50 µl.

The apparatus according to the invention, the liquid reservoir according to the invention, the system according to the invention, and the use according to the invention allow for discontinuous dispensing of liquid in puffs. The amount of liquid dispensed per puff is determined by the spray head, thus making it possible to introduce or apply well-defined amounts of liquids to the animal feed. The risk of over- or underdoses may thus be reduced. In this respect, the dispensing of metered quantities of liquid takes places electrolessly to the effect that the energy required for actuating the spray head is derived from the conveying movement of the conveying system. It is not required to control an electronic dispensing means for dispensing metered quantities of liquid. Accordingly, the apparatuses, systems, and methods according to the invention have high robustness and reliability.

The apparatus according to the invention, the liquid reservoir according to the invention, the system according to the invention, and the use according to the invention allow for relatively evenly applying or introducing one or more additives authorized under pharmaceutical and/or feed law to animal feed since a spray head is mechanically actuated and the animal feed is sprinkled for the purpose of application or introduction. Mechanical actuation takes places electrolessly by means of dissipating the movement for actuating the spray head from the movement of the transmission element caused by the conveying system.

In the following, preferred embodiments of the invention are described in detail with reference to the Figures, in which:

FIG. 7 shows an enlarged, partially cut-off side view of the apparatus according to FIG. 1;

FIG. 8 shows an enlarged view of detail F according to FIG. 7;

Figure 1:
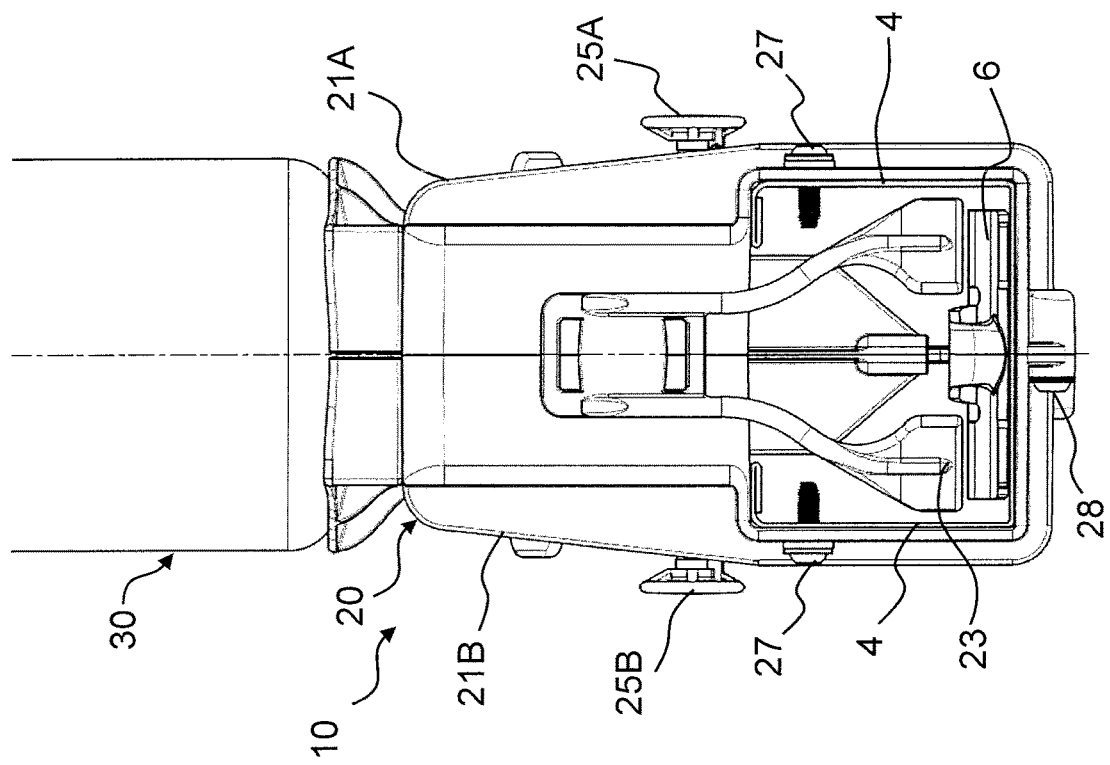
FIG. 1 shows a top view of an apparatus according to the invention in a direction parallel to a conveying direction of a conveying system.
Figure 2:
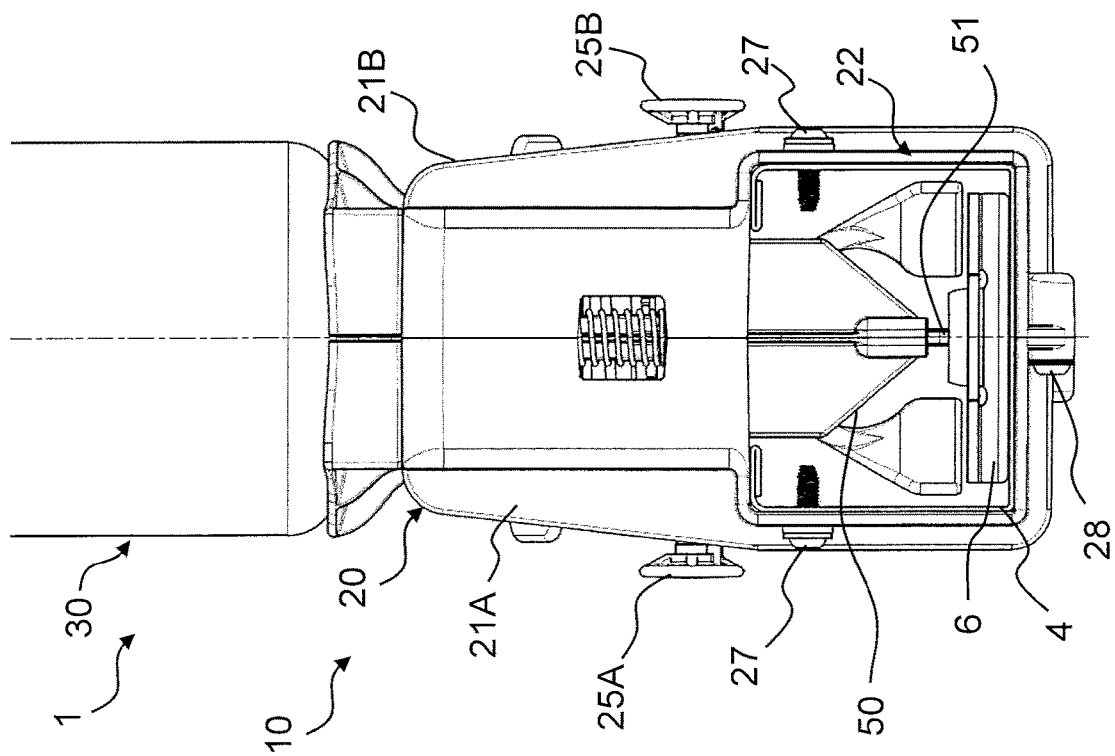
FIG. 2 shows a further top view of the apparatus according to FIG. 1 in a direction parallel to a conveying direction of a conveying system.
Figure 3:
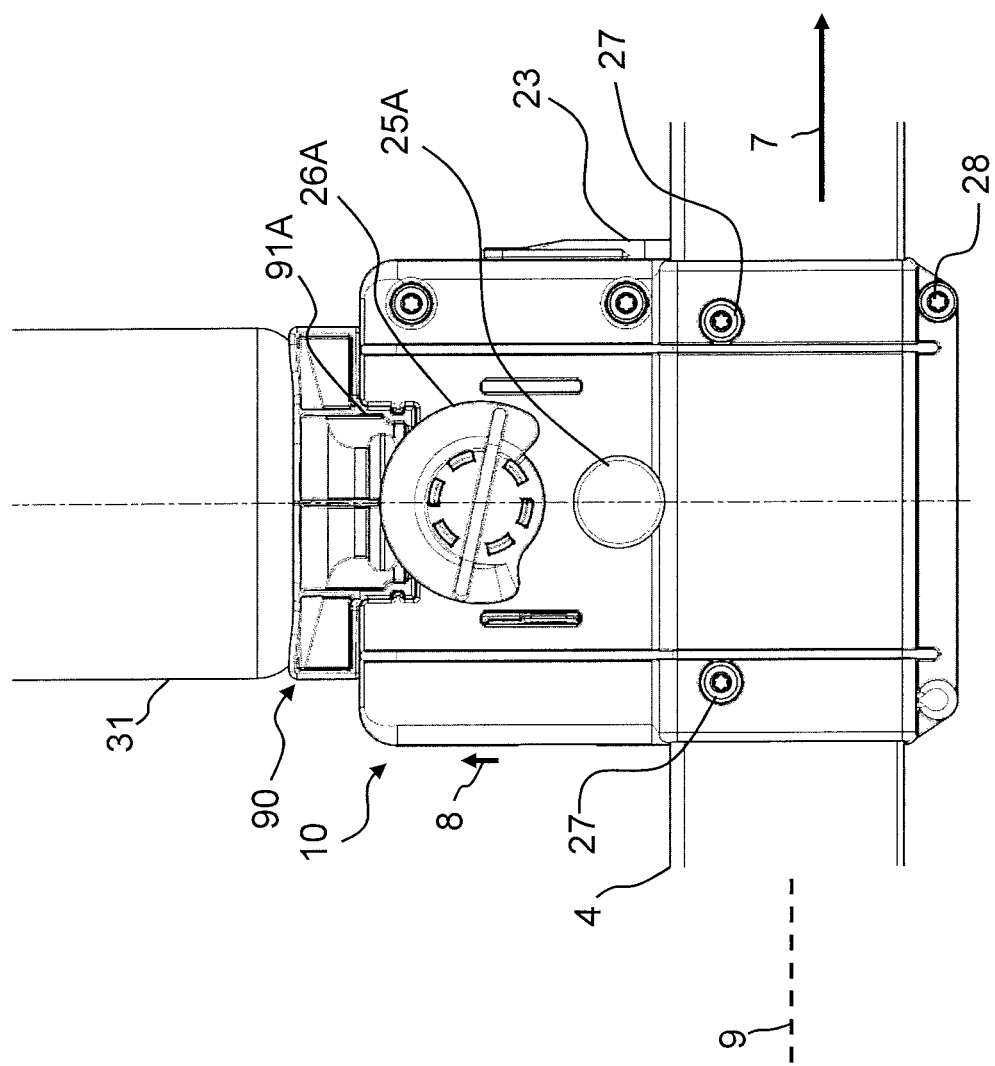
FIG. 3 shows a side view of the apparatus according to FIG. 1.
Figure 4:
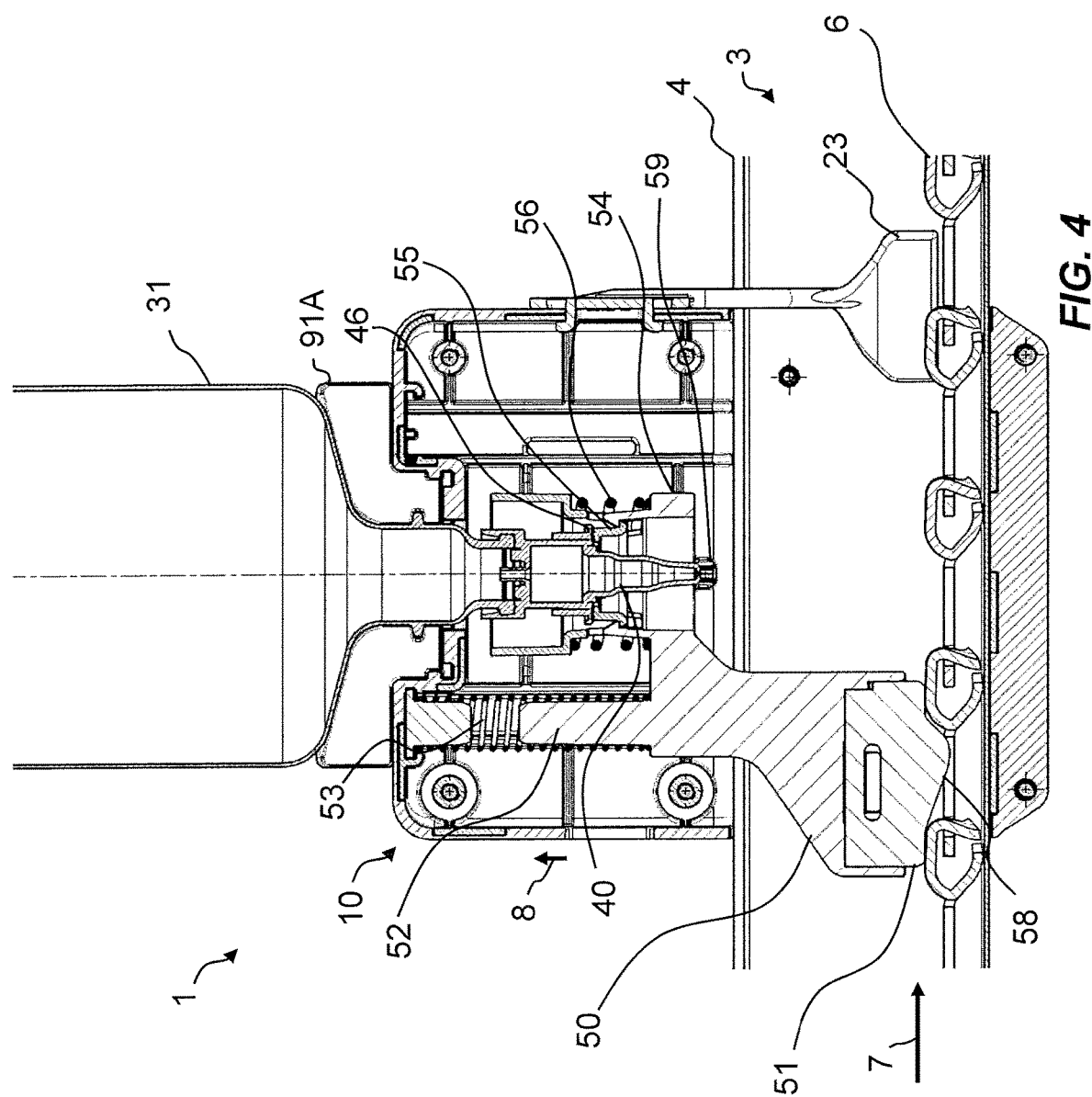
FIG. 4 shows a partially cut-off side view of the apparatus according to FIG. 1.
Figure 5:
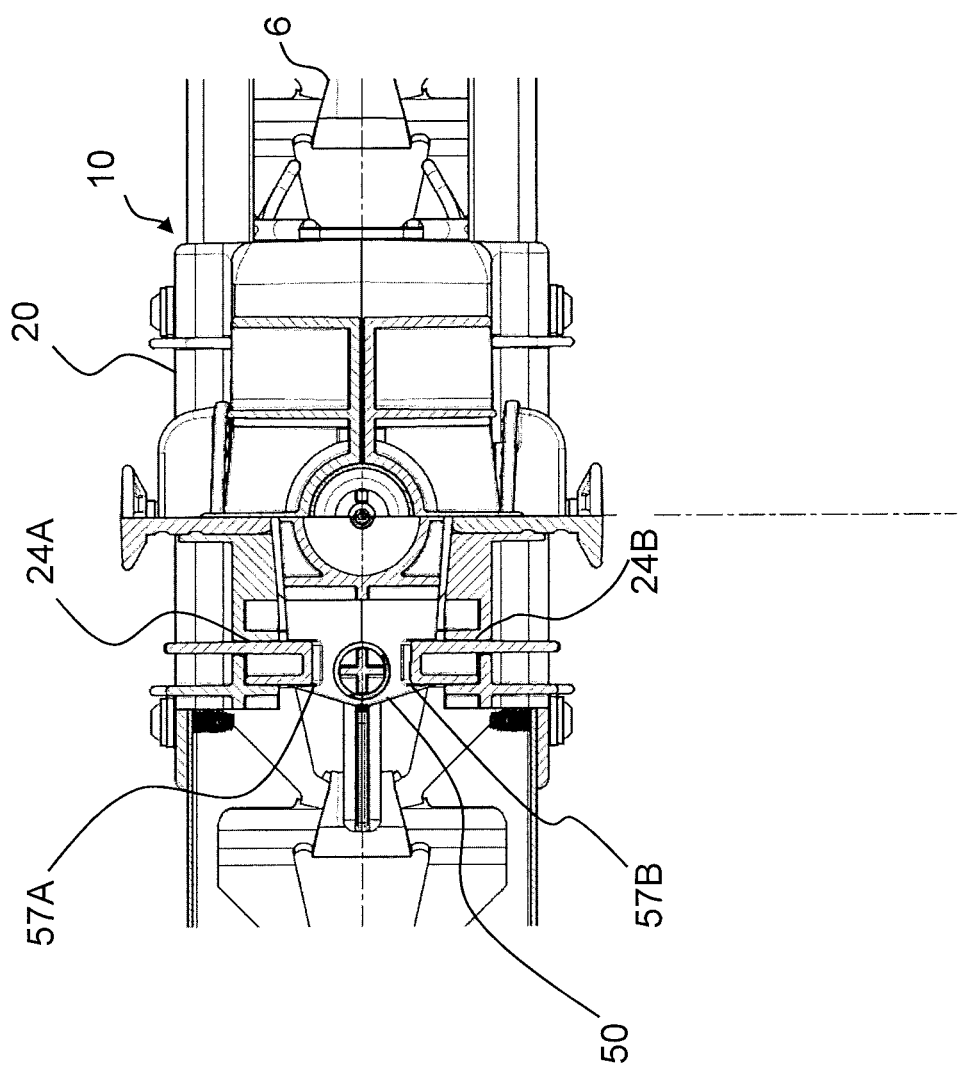
FIG. 5 shows a partially cut-off top view of the apparatus according to FIG. 1 in a direction perpendicular to a conveying direction of a conveying system.
Figure 6:
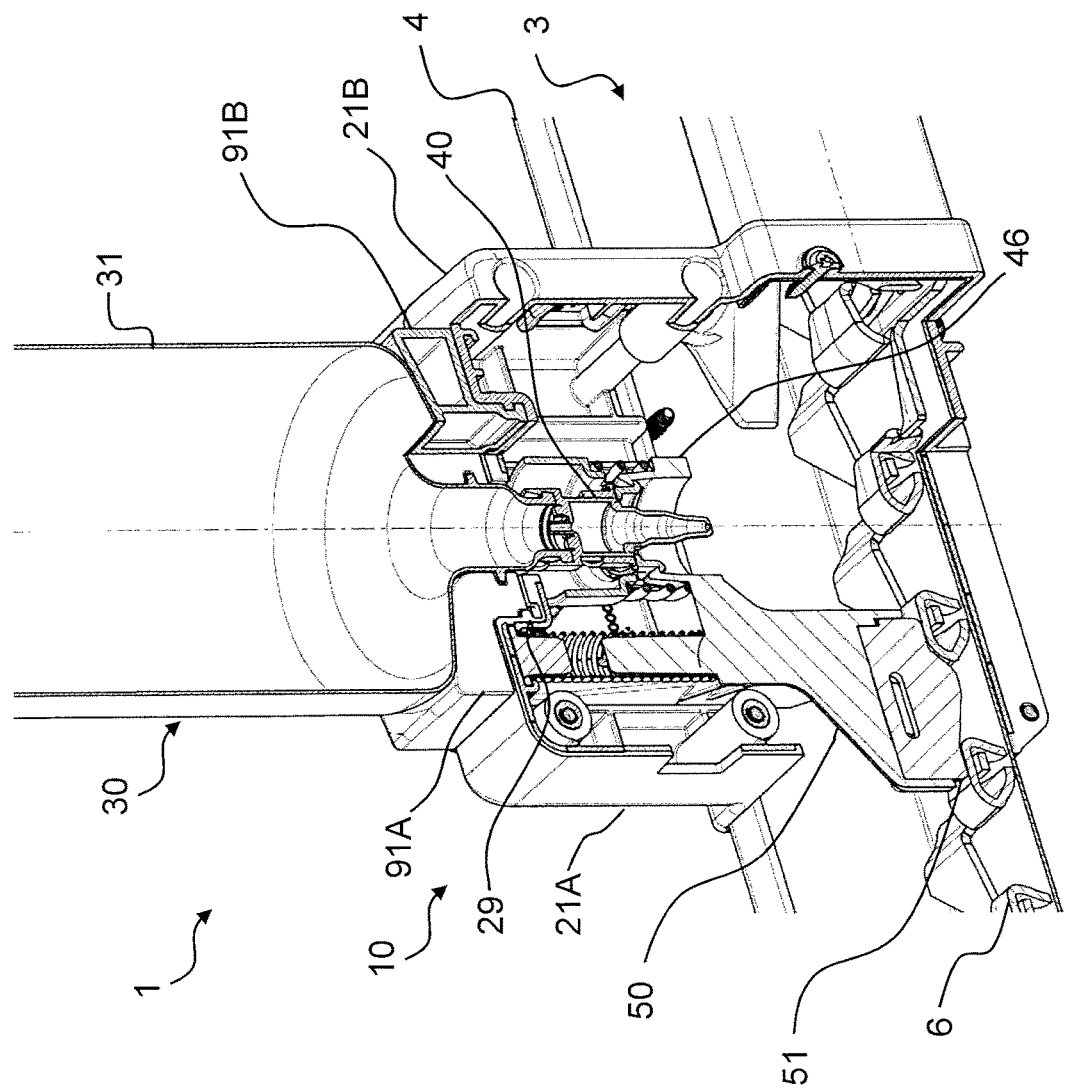
FIG. 6 shows a partially cut-off perspective view of the apparatus according to FIG. 1.
Figure 9:
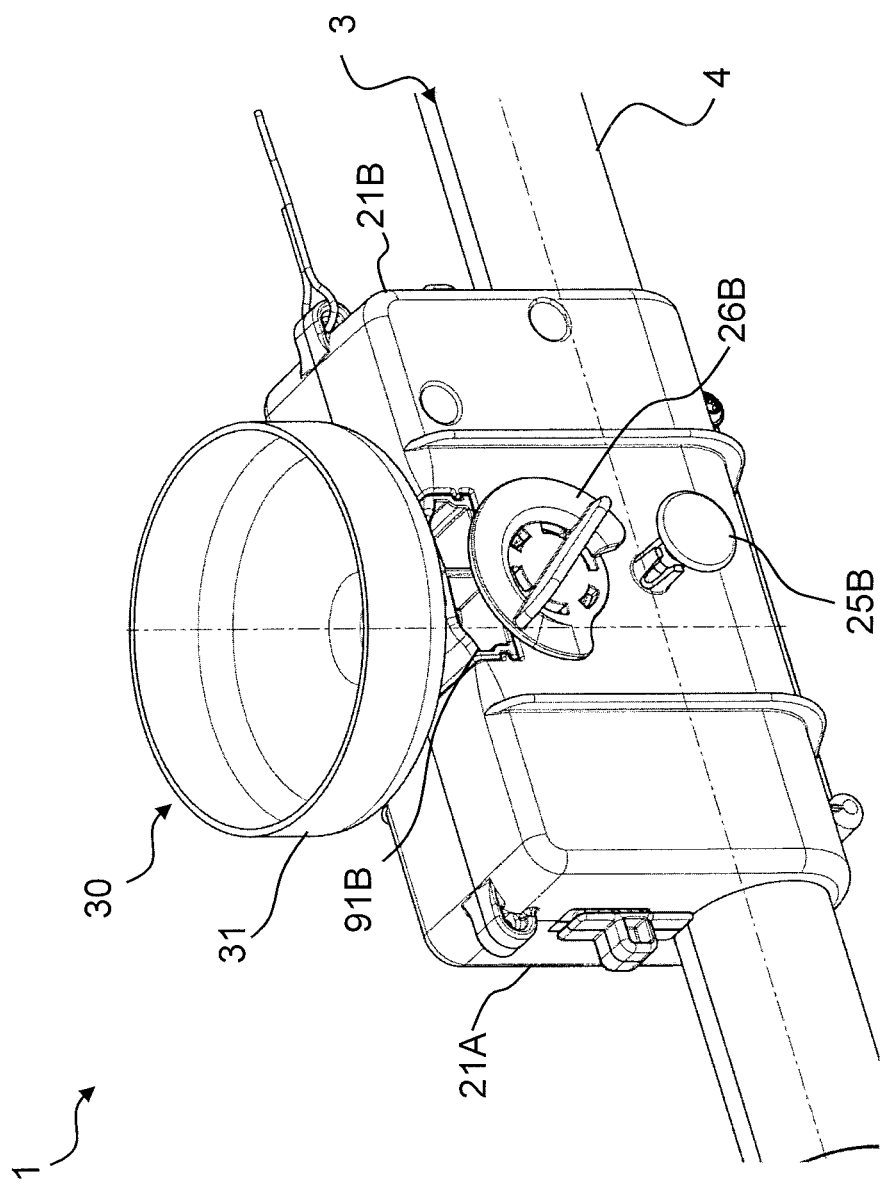
FIG. 9 shows a perspective view of a further apparatus according to the invention.
Figure 10:
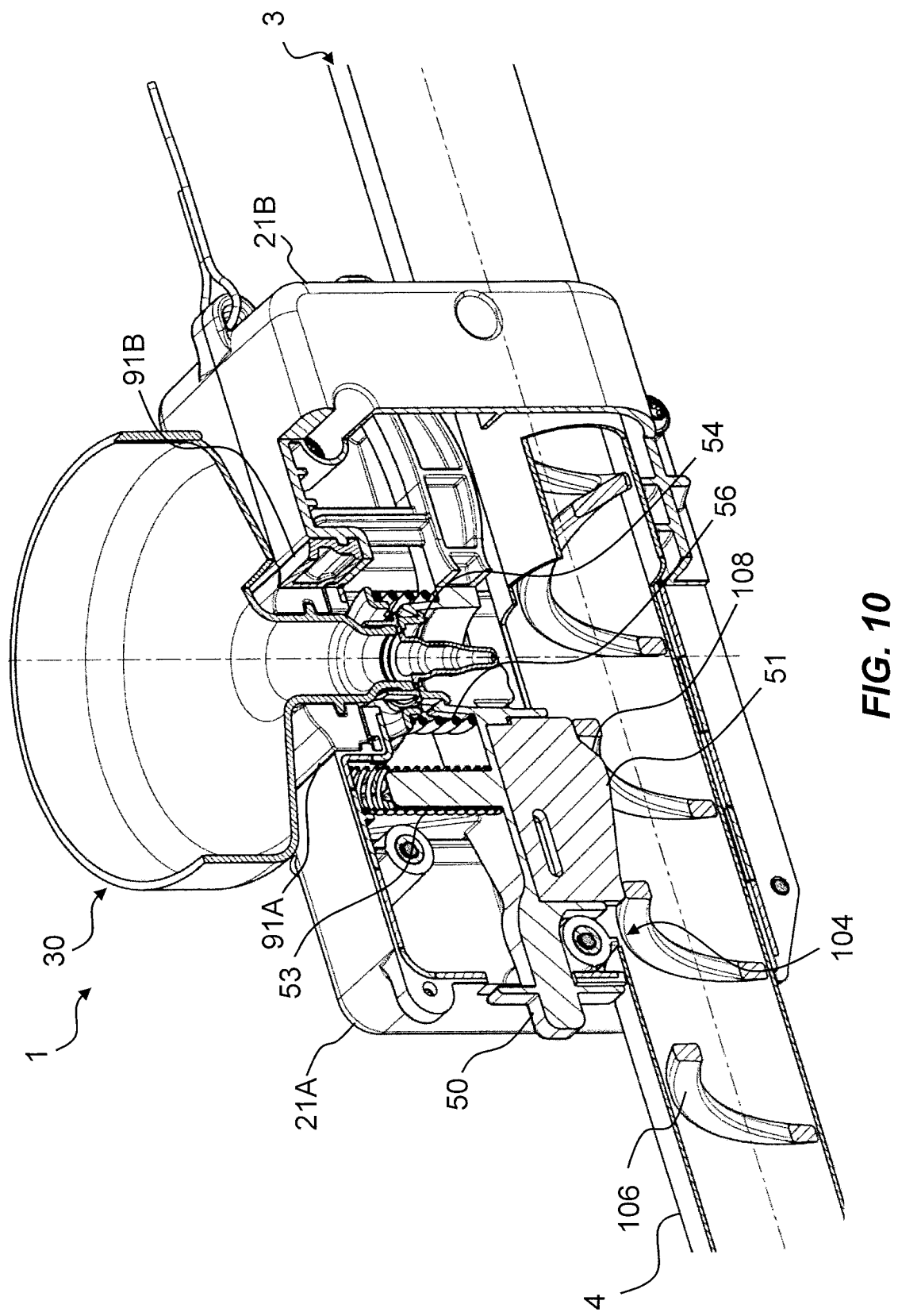
FIG. 10 shows a partially cut-off perspective view of the apparatus according to FIG. 9.
Figure 11:
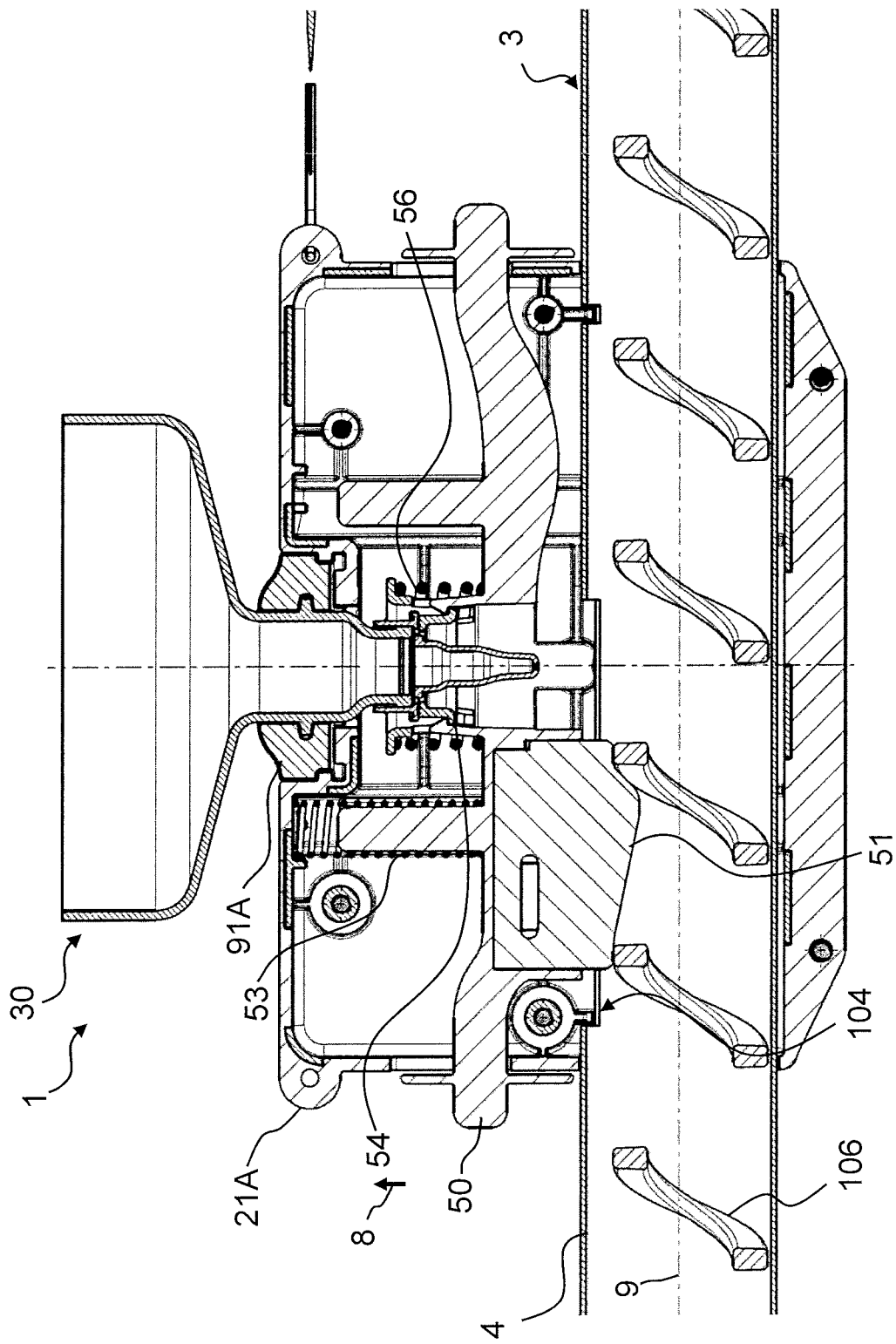
FIG. 11 shows a partially cut-off side view of the apparatus according to FIG. 9.
Figure 12:
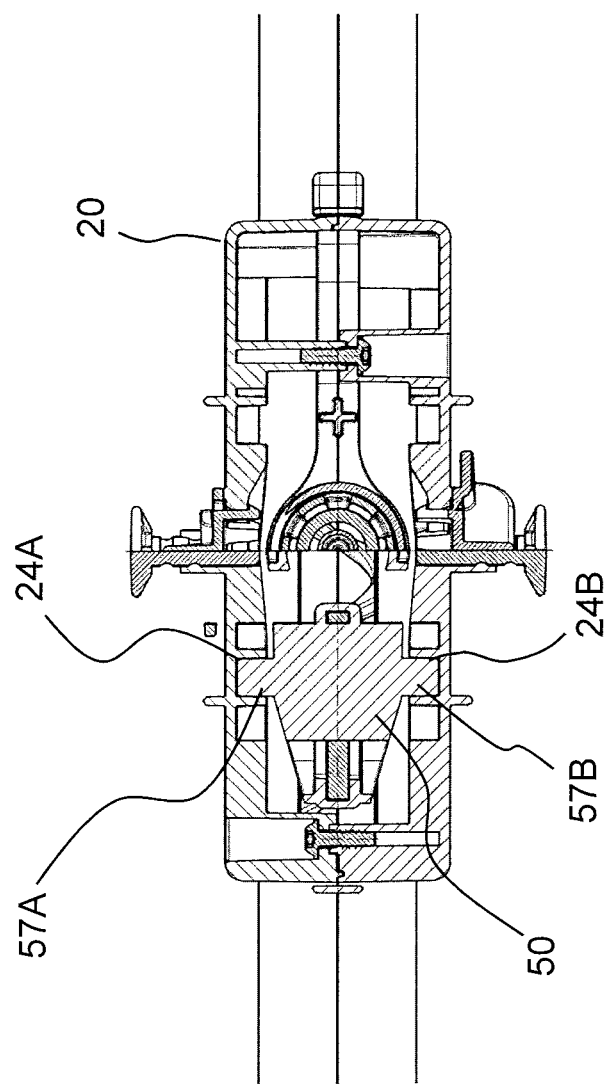
FIG. 12 shows a partially cut-off top view of the apparatus according to FIG. 9 in a direction perpendicular to a conveying direction of a conveying system.

In the following, preferred and advantageous embodiments of the invention are described with reference to the figures, in which identical reference signs describe identical or similar elements. The features of the different embodiments may be combined with each other unless not explicitly ruled out in the following description.

FIGS. 1 to 8 show different views of a system 1 comprising an apparatus 10 and a liquid reservoir 30 according to an embodiment. The system 1, the apparatus 10, and the liquid reservoir 30 may generally be used to sprinkle dry feed or other animal feed with one or more additives authorized under pharmaceutical and feed law. The additive may be a pharmaceutical or comprise a pharmaceutical. The term "pharmaceutical" in the context of this application also includes vaccines and anthelmintic therapy. The additive may be a forage additive or comprise a forage additive. The additive may comprise one or more of further supplementary products authorized under pharmaceutical and/or feed law. In this context, said additives may be contained in the container 31 of the liquid reservoir 30 in liquid form or as a solution, e.g., as a water solution, as an emulsion, or a suspension.

The apparatus 10 is configured such that it is mountable to a conveying system 3 for animal feed. The apparatus 10 comprises a transmission mechanism by means of which a conveying movement of a conveying member, e.g., a chain 6, of the conveying system 3 is converted to a movement for actuating a spray head 40 of the liquid reservoir 30. The transmission mechanism may preferably be configured such that the movement of the conveying member causes translational movement of a transmission element 50 of the apparatus 10 relative to a housing 20, as will be described in more detail.

The apparatus 10 comprises the housing 20. The housing 20 may comprise a first housing part 21A and a second housing part 21B. The housing parts 21A, 21B may be housing halves. The housing parts 21A, 21B may be substantially mirror-symmetrical. The housing parts 21A, 21B define a conduit 22 in which a wall 4 of a conveying system 3 for animal feed can be received. In the mounted state of the apparatus 10, a longitudinal axis 9 of the conduit 22 is directed along a conveying direction 7 of the conveying system 3. The housing 20 is configured such that it may be brought into snug abutment with the wall 4. The housing 20 may define a shoulder which may rest on an upper surface of the wall 4 when the apparatus 10 is in the mounted state.

In order to mount the apparatus 10 to the conveying system 3, the two housing parts 21A, 21B may be mounted to the conveying system 3 from different sides, so that the two housing parts 21A, 21B together engage around the wall 4 at least partially. In the mounted state of the apparatus 10, the housing parts 21A, 21B may be fixed to the wall 4 of the conveying means with screws 27 or other fastening means such as bolts. Accordingly, the housing 20 comprises clearance holes for fastening means for fastening the housing parts 21A, 21B to the wall 4. In the mounted state of the apparatus 10, the housing parts 21A, 21B may be connected with each other by means of screws 28 or other fastening means such as bolts or clamps.

The apparatus 10 comprises a mount 90 for the liquid reservoir 30. The liquid reservoir 30 generally comprises a container 31 and a spray head 40. The spray head 40 is configured to dispense an amount of liquid in response to actuation of an actuation section 46 of the spray head 40. The liquid reservoir 30 may be configured such that a substantially rectilinear movement of the actuation section 46 causes dispensing of an amount of a liquid. In this process, a nozzle 45 of the spray head 40 may dispense the amount of liquid in the form of small drops or spray mist for sprinkling.

The mount 90 is configured such that it securely holds the liquid reservoir 30 in its position and thus substantially prevents the container 31 of the liquid reservoir from receding when the actuation section 46 of the spray head 40 is actuated. The mount 90 thus serves as an abutment when the spray head 40 is actuated by the apparatus 10.

The mount 90 may comprise at least a first mounting element 91A and a second mounting element 91B. The first mounting element 91A and the second mounting element 91B may be movable relative to the housing 20 when in a state in which the liquid reservoir 30 is mounted to the apparatus 10 or dismounted from the apparatus 10. The first mounting element 91A and the second mounting element 91B may, e.g., be displaceably mounted to the housing 20 via at least one guide rail 29 or preferably at least two guide rails 29 of the housing 20. The first mounting element 91A and the second mounting element 91B may be removable from the housing 20 when in a state in which the liquid reservoir 30 is mounted to the apparatus 10 or dismounted from the apparatus 10.

In a state in which the liquid reservoir is mounted to the apparatus 10 and held by the mount 90, the first mounting element 91A and the second mounting element 91B may preferably be locked at the housing 20 such that they define an insertion opening through which a section of the liquid reservoir 30 extends into the interior of the housing. In order to lock the first mounting element 91A and the second mounting element 91B, a first locking element 26A and a second locking element 26B may be movably mounted at the housing 20. The first locking element 26A and the second locking element 26B may be movable between a first position in which they allow for movement of the first mounting element 91A and the second mounting element 91B relative to the housing 20, and a second position in which they secure the first mounting element 91A and the second mounting element 91B relative to the housing 20. The first locking element 26A and the second locking element 26B may, e.g., be tiltable or rotatable as shown in FIGS. 1 to 8. Alternatively, the first locking element 26A and the second locking element 26B may also be displaceable in order to selectively secure the mounting elements 91A, 91B.

In order to hold the liquid reservoir 30, the first mounting element 91A and the second mounting element 91B may preferably engage around the spray head 40 and/or a neck 38 of the container 31 from opposite sides. The mount 90 may hold the liquid reservoir 30 in a frictional or form-fit manner. In a preferred embodiment, the liquid reservoir 30 and the mount 90 may be configured for form-fit engagement. For this purpose, the mount 90 may comprise a first engagement portion, and the liquid reservoir 30 may comprise a second engagement portion corresponding therewith. The first engagement portion may preferably comprise a recess 92A in the first mounting element 91A and the second mounting element 91B. The recess may be partially or completely annular-shaped at an internal wall of the first mounting element 91A and the second mounting element 91B limiting the insertion opening. The second engagement portion may preferably comprise a projection 39. The projection 39 may completely or partially annularly surround a neck 38 of the container 31. Alternative embodiments of the engagement portions are possible. For instance, a tongue-and-groove joint may also be achieved when a recess is formed at the liquid reservoir 30, and a corresponding projection is formed at the first and second mounting elements 91A, 91B. More complex embodiments of engagement portions at the mount 90 and the liquid reservoir 30 corresponding with each other may also be used. A form-fit connection between the mount 90 and the liquid reservoir 30 may also be achieved when the mount 90 extends into a cavity 36 between an immovable collar 42 of the spray head and the container 31. As an alternative or in addition, the mount 90 may be brought into form-fit engagement with a part of the collar 42 of the spray head 40 that is not moved upon actuation of the actuation section 46.

The liquid reservoir 30 may preferably comprise the container 31 with which the spray head 40 is connected. The spray head 40 may be pressed on, snapped onto, or crimped on the container 31 or be mounted thereto in another way. The spray head 40 may comprise the collar 42 that is immovable relative to the container 31, and an actuation section 46 that is movable relative to the container 31. The actuation section 46 may cause dispensing of an amount of liquid from the container 31 when displaced in a translational, particularly linear, manner. For this purpose, the spray head 40 may, e.g., comprise a dosing pump which is actuated upon actuation of the actuation section 46. The liquid may be dispensed via a nozzle 45 of the spray head. The container 31 may have an internal volume of, e.g., at least 0.25 liters. Different embodiments may be used depending on the use. For example, the container 31 may have an internal volume of at least 0.5 liters, in particular of at least 1.0 liters, in particular of at least 1.5 liters. The liquid reservoir 30 may comprise an engagement portion which may, e.g., be formed as a projection 39 or a recess in order to allow for form-fit coupling between the liquid reservoir 30 and the mount 90, as has already been explained in detail above.

The spray head 40 may be actuated mechanically. The apparatus 10 is configured such that it may cause movement of the actuation section 46 of the spray head 40. The apparatus 10 is configured such that it may operate electrolessly and that the movement for repeatedly, in particular periodically, actuating the spray head 40 is derived from the conveying movement of the conveying system 3. Features with which the apparatus 10 derives the movement from a conveying means of the conveying system 3 for actuating the spray head 40 will be described in more detail in the following. For this purpose, in FIGS. 1 to 8 the apparatus 10 is configured to be used in a chain conveyor comprising a chain 6 with a plurality of chain links.

The apparatus 10 comprises a transmission element 50. The transmission element 50 may be movably mounted in the housing 20. The transmission element 50 may in particular be translationally displaceably mounted in the housing 20. The transmission element 50 may be mounted in the housing 20 such that it is movable in a direction transverse, in particular substantially perpendicular, to a longitudinal axis 9 of the conduit 22 of the housing.

The housing 20 may comprise a linear guide in order to guide the transmission element 50 in the housing 20. The linear guide may comprise guide grooves 57A, 57B at the transmission element 50, and guide tongues 24A, 24B at the housing 20. A tongue-and-groove linear sliding guide may also be formed when guide tongues of the transmission element 50 engage with guide grooves of the housing 20.

The transmission element 50 may comprise a multipart configuration. The transmission element 50 may comprise a first section which comes into contact with the conveying member of the conveying system and which is the section actuated by the conveying system. The first section may be a metallic section, particularly a metal skid 51. The transmission element 50 may comprise at least one second section which does not come into contact with the conveying member of the conveying system. The second section may be made of plastic. The transmission element 50 may be configured such that the metal skid 51 is encapsulated with the second section. Alternatively, the metal skid 51 may be mounted to the second section in a different manner.

The transmission element 50 is urged in the direction of the chain links of the chain 6 of the chain conveyor by means of a return spring 53. Other elastic means may be used instead of the return spring 53. The return spring 53 may be a coil spring that is fitted on a spring seat 52 of the transmission element 50. During operation of the chain conveyor, the chain links of the chain 6 slide along a bearing surface 58 of the transmission element 50. The bearing surface 58 is tilted relative to the longitudinal axis 9 of the conduit 22. By means of movement of a chain link along the bearing surface 58, the transmission element is pressed in a direction towards the mount 90 starting from its initial position as shown in, e.g., FIG. 4. The conveying movement of the conveying system 3 is converted into movement 8 of the transmission element 50, said movement 8 being directed transversely, in particular perpendicularly, to the conveying direction 7 of the conveying system.

The transmission element 50 may preferably comprise an actuating section 54 that acts on the actuation section 46 of the liquid reservoir 30 directly or via at least one intermediate member when the transmission element is moved by the impact of the conveying system 3. The actuating section 54 may be coupled with a pressure element 55 such that said pressure element 55, too, is moved for actuating the spray head 40 when the actuating section 54 moves upwards. The pressure element 55 may be configured as a separate element that is coupled with the transmission element 50 via, e.g., a snap-in connection. In this context, said snap-in connection may allow for movement of the pressure element 55 in a direction towards the conduit 22 relative to the transmission element. A compensating element 56, which can be a coil spring or another resilient means, allows for relative movement between the pressure element 55 and the transmission element 50. The compensating element 56 may abut the transmission element 50. The compensating element 56 may be a compression spring. The compensating element 56 may urge the pressure element 55 in a direction away from the conduit 22 and towards the mount 90 in which snap-in hooks of the pressure element 55 abut corresponding undercuts of the transmission element 50. By means of a configuration in which the actuating section 46 acts on the actuation section 46 of the spray head 40 via the pressure element 55 and in which the compensating element 56 guarantees relative mobility between the pressure element 55 and the transmission element 50, reliable mechanical actuation of the spray head 40 may be achieved even when the liquid reservoir 30 is mounted to the apparatus 10 in a tilted or displaced manner.

In the mounted state of the apparatus 10, actuation of the spray head 40 is caused every time when a chain link of the chain 6 urges the transmission element 50 in a direction 8 towards the mount 90 when the conveying system 3 is operated. The spray head 40 may comprise a nozzle 45 through which an amount of liquid is respectively dispensed in the form of a spray cone. The spray head and the apparatus 10 may be adapted to one another such that the diameter of the spray cone impinging on the animal feed is at least approximately as large as a distance between successive chain links which cause actuation of the spray head 40 by means of the apparatus 10.

Figure 13:
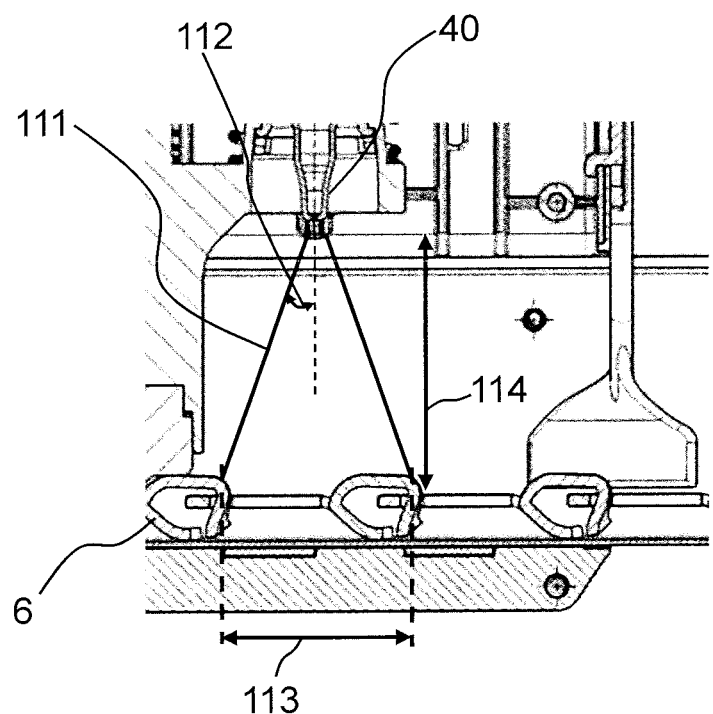
FIG. 13 shows a schematic sectional view for explaining the functioning of the apparatus, the liquid reservoir, and the system according to an embodiment.

FIG. 13 shows a configuration according to an embodiment. The spray head 40 is configured to dispense an amount of liquid in a spray cone 111 each time the spray head 40 is actuated. The nozzle of the spray head 40 may determine an aperture angle 112 of the spray cone 111 in such a way that, when impinging on the animal feed, a diameter 113 of the spray cone 111 in the conveying direction is at least equal to a distance between chain links of a chain conveyor. When using the apparatus at a spiral conveyor, the nozzle of the spray head 40 may determine the aperture angle 112 of the spray cone 111 in such a way that, when impinging on the animal feed, a diameter 113 of the spray cone 111 in the conveying direction is at least equal to a pitch of a conveyor worm of the spiral conveyor. When using the apparatus at a cable conveyor, the nozzle of the spray head 40 may determine the aperture angle 112 of the spray cone 111 in such a way that, when impinging on the animal feed, a diameter 113 of the spray cone 111 in the conveying direction is at least equal to a distance between carriers of the cable conveyor.

The apparatus 10 may hold the nozzle of the spray head 40 at a height 114 above the conveyed animal feed, said height ensuring that the spray cone 111 dispensed with one single puff completely or at least substantially completely covers the area between successive chain links of the chain conveyor, successive pitches of the spiral conveyor, or successive carriers of the cable conveyor.

The spray cone 111 may be a circular cone or comprise a conical shape different therefrom. For instance, the spray cone may be a straight or oblique elliptical cone. The nozzle of the spray head 40 may accordingly be configured so as to dispense an aerosol in a spray cone 111 in the form of a dispersion of liquid droplets in a gas, said spray cone 111 being a straight or oblique circular cone, a straight or oblique elliptical cone, or a different cone.

The aperture angle of the spray cone 111 may be smaller than 50°, particularly smaller than 35°. The aperture angle of the spray cone 111 may be smaller than 30°, particularly smaller than or equal to 28°.

The apparatus 10 may comprise a blender 23. The blender 23 may comprise a fingerlike projection, two fingerlike projections, or more than two fingerlike projections for blending the feed after it has been sprinkled with one or more additives authorized under pharmaceutical and/or feed law, e.g., pharmaceuticals, forage additives, and/or further supplementary products authorized under pharmaceutical and/or feed law. The blender 23 and the section 51 of the transmission element, which is actuated by the conveying member, may be arranged at opposite ends of the housing 20.

The apparatus 10 may be configured so as to allow for an interruption of the sprinkling process even when the apparatus 10 and the liquid reservoir 30 are in the mounted state. For this purpose, the transmission element 50 may be lockable in a position in which it is permanently disengaged from the conveying member of the conveying system. A locking mechanism may, e.g., comprise one or more pins 25A, 25B which are engagable with a bearing surface 59 of the transmission element 50 in order to hold the transmission element 50 in a position in which it is permanently disengaged from the conveying member of the conveying system. Different locking mechanisms may be used.

While an apparatus according to the invention which is suitable for use with a chain conveyor was described with respect to FIGS. 1 to 8, apparatuses according to the invention may be deployed also for the use of a plurality of further conveying systems, as will be described in more detail with respect to FIGS. 9 to 12.

FIGS. 9 to 12 show different views of a system 1 comprising an apparatus 10 and a liquid reservoir 30 according to an embodiment. In this context, the apparatus 10 is configured to be actuated by a spiral conveyor of the conveyor system 3. Elements which correspond to the elements of the apparatus already described with respect to FIGS. 1 to 8 in view of their configurations and functions are designated with the same reference signs.

The apparatus 10 is configured to be mountable on a wall 4 of a spiral conveyor of the conveying system 3. The wall 4 may comprise an opening 104 via which an actuated section 51 of the transmission element 50 may engage with the conveyor worm 106 of the spiral conveyor 4. A bearing surface 108 of the actuated section 51 may be inclined in such a way that the transmission element is deflected once per revolution of the conveyor worm 106 by means of movement of the conveyor worm 106, e.g., in a direction 8 towards the mount 90 and transverse to the conveying direction of the spiral conveyor. As described with respect to FIGS. 1 to 8, the actuation section 46 of the spray head 40 is actuated when the transmission element 50 is deflected from its initial position. In this context, the transmission mechanism, with which the translational movement of the transmission element 50 is derived from movement of the spiral conveyor in order to actuate the spray head, may be configured as described with reference to FIGS. 1 to 8.

The apparatus 10 depicted in FIGS. 9 to 12 does not necessarily have to comprise a blender. The stirring of the sprinkled animal feed may be carried out by means of the conveyor worm of the conveying system 3.

Figure 14:
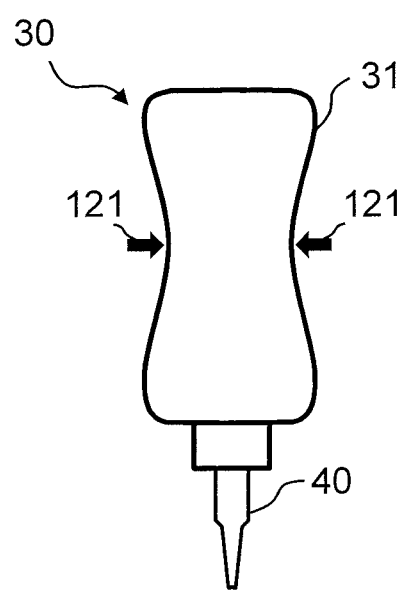
FIG. 14 schematically depicts a liquid reservoir according to an embodiment.

FIG. 14 shows a configuration of a liquid reservoir 30 according to an embodiment. The liquid reservoir 30 may be configured such that during or after dispensing of a puff, the pressure in the interior of the container 31 is increased again to a value that substantially corresponds to the pressure prior to dispensing the puff. For this purpose, the container 31 may be configured as a tubular bag which is deformable during or after actuation of the spray head 40 when a force 121 acts thereon, as is illustrated in FIG. 14. The force 121 may be provided by means of air pressure. As an alternative or in addition, the force 121 may be automatically generated by the apparatus 10 and increased according to the amount of liquid dispensed in total.

As an alternative or in addition, the liquid reservoir 30 may comprise a pressure compensation mechanism. Said pressure compensation mechanism may comprise a valve which allows for a gas to stream into the container 31 during or after dispensing a puff. Alternatively or additionally, the pressure compensation mechanism may comprise an opening in the container 31 which allows for a gas to stream into the container during or after dispensing of a puff. The container 31 may comprise a weak spot for facilitating the insertion of the opening by the user. The opening may be inserted at the bottom of the container 31 or at another suitable location of the container 31 by means of piercing the weak spot with a tip, e.g., a pin or a needle.

A liquid reservoir with a mechanism that increases the internal pressure of the container 31 during or after dispensing a puff such that reliable dispensing of another puff is guaranteed, as is exemplarily described with reference to FIG. 14, may be deployed with the apparatuses and systems according to any one of the embodiments described with reference to FIG. 1 to FIG. 13.

The disclosed apparatuses, liquid reservoirs, systems, and uses may allow for sprinkling animal feed with an aerosol. By means of actuation of the spray head caused by the conveying system, the aerosol may be produced as a dispersion of liquid droplets in a gas and dispensed in the direction of the conveyed animal feed.

In all the disclosed apparatuses, liquid reservoirs, systems, and uses, the pharmaceutical may be a veterinary pharmaceutical, e.g., a veterinary pharmaceutical for farm animals such as laying hens, broilers, or pigs. In all the disclosed apparatuses, liquid reservoirs, systems, and uses, the forage additive may be a forage additive for animals, e.g., a forage additive for farm animals such as laying hens, broilers, or pigs.

While embodiments have been described in detail with reference to the figures, modifications may be implemented with respect to further embodiments. For instance, the transmission element is not required to be guided in a linear guide in the housing 20. The stroke movement for actuating the spray head 40 may also be derived from the conveying movement of the conveying system by means of other transmission elements than illustrated. Liquid reservoirs with a plurality of different configurations may be deployed. The volume of the liquid reservoir according to the invention may be adapted to the respective requirements of the farm in which the animal feed is to be sprinkled. The liquid reservoir according to the invention may comprise different embodiments which allow for a non-destructively releasable coupling thereof with the apparatus according to the invention. The liquid reservoir according to the invention may comprise one or more of a pharmaceutical (including a vaccine or anthelmintic therapy), a forage additive, and/or a further supplementary product authorized under pharmaceutical and/or feed law. The pharmaceutical, the forage additive, and/or the further supplementary product authorized under pharmaceutical and/or feed law may be present in liquid form or as a solution.

The apparatus according to the invention, the liquid reservoir according to the invention, the system according to the invention, and the use according to the invention allow for discontinuous dispensing of puffs of pharmaceuticals, forage additives, and/or further supplementary products authorized under pharmaceutical and/or feed law.

The apparatus according to the invention, the liquid reservoir according to the invention, the system according to the invention, and the use according to the invention allow for relatively evenly applying or introducing one or more additives authorized under pharmaceutical and/or feed law to animal feed since a spray head is mechanically actuated and the animal feed is sprinkled for the purpose of application or introduction. The apparatus may be mounted in an easy and cost-effective manner since the movement necessary for mechanically actuating the spray head is derived from the conveying movement of the conveying system.

The invention claimed is:

1. An apparatus for electrolessly sprinkling animal feed, in particular dry feed, with pharmaceuticals, forage additives, and/or further supplementary products authorized under pharmaceutical and/or feed law in a conveying system, wherein the apparatus comprises:
    a housing;
    a mount for a liquid reservoir with a mechanically actuatable spray head; and
    a transmission element which is movably mounted in the housing;
    wherein the transmission element is configured so as to be moved by the conveying system; and wherein the transmission element comprises a section actuating the spray head, said section being configured to transmit movement of the transmission element to the spray head.

2. The apparatus according to claim 1, wherein the transmission element is configured so as to operatively cooperate with a chain of a chain conveyor, with a spiral of a spiral conveyor, or with carriers at a cable conveyor.

3. The apparatus according to claim 1, wherein the transmission element is mounted in the housing via a linear guide.

4. The apparatus according to claim 3, wherein the transmission element is displaceable within the housing via the linear guide substantially transversely to the conveying direction of the conveying system.

5. The apparatus according to claim 3, wherein the linear guide is a linear sliding guide.

6. The apparatus according to claim 5, wherein the linear sliding guide has at least one tongue section and at least one groove section.

7. The apparatus according to claim 1,
wherein the transmission element is mounted in the housing such that the actuating section moves substantially linearly, and/or
wherein the actuating section comprises a pressure element movably coupled with the transmission element via which movement of the transmission element is transmissible to an actuation section of the spray head.

8. The apparatus according claim 7, wherein an elastic compensating element is arranged between the transmission element and the pressure element.

9. The apparatus according to claim 1, wherein the apparatus further comprises an elastic return element, which is deformed during actuation of the transmission element by means of the conveying system and which subsequently urges the transmission element back into its initial position.

10. The apparatus according to claim 9, wherein the elastic return element is a coil spring.

11. The apparatus according to claim 1,
wherein the housing comprises a first housing part and a second housing part; and
wherein the housing is configured such that it is mountable to a wall of the conveying system.

12. The apparatus according to claim 11, wherein the first housing part and the second housing part is a first and a second housing half.

13. The apparatus according to claim 11, wherein the first housing part and the second housing part are configured such that together they engage around the wall of the conveying system.

14. The apparatus according to claim 1, wherein the housing comprises a blender.

15. The apparatus according to claim 1, wherein the mount is configured so as to engage around the spray head.

16. The apparatus according to claim 15, wherein the mount comprises:
one or more projections which at least in sections extend around the spray head and/or around a container of the liquid reservoir, and/or
at least one engagement portion for engaging with a corresponding engagement portion of the liquid reservoir.

17. The apparatus according to claim 1, wherein the spray head comprises a nozzle which is configured to dispense an amount of liquid in a spray cone.

18. A liquid reservoir for sprinkling animal feed, comprising:

a container containing a pharmaceutical, a forage additive, and/or a further supplementary product authorized under pharmaceutical and/or feed law; and
a mechanically actuatable spray head,
wherein the container comprises an engagement portion for releasably coupling with an apparatus for electrolessly sprinkling animal feed.

19. The liquid reservoir according to claim 18,
wherein the engagement portion comprises a projection which at least partially surrounds a part of the container in a circumferential direction, and/or wherein the engagement portion comprises a recess which at least partially surrounds a part of the container in a circumferential direction, and/or
wherein the container holds a liquid volume of at least 0.25 liters.

20. The liquid reservoir according to claim 18, wherein the spray head comprises a nozzle configured to dispense an amount of liquid in a spray cone.

21. A use of a liquid reservoir according to claim 18, which is filled with a pharmaceutical, a forage additive, and/or a further supplementary product authorized under pharmaceutical and/or feed law, and comprising a mechanically actuatable spray head for sprinkling animal feed in an automated conveying system, the use comprising:
coupling the liquid reservoir with an apparatus; and
operating the conveying system.

22. The use according to claim 21, further comprising replacing the liquid reservoir.

23. The use according to claim 21, wherein the container holds a liquid volume of at least 0.25 liters.

24. The system according to claim 21, wherein the animal feed is dry feed.

25. The system according to claim 21, wherein the container holds a liquid volume of at least 1.5 liters.

26. A system for sprinkling animal feed, in particular dry feed, with pharmaceuticals, forage additives, and/or further supplementary products authorized under pharmaceutical and/or feed law in a conveying system, wherein the system comprises:
an apparatus according to claim 1;
a container for a liquid comprising a pharmaceutical, a forage additive, and/or a further supplementary product authorized under pharmaceutical and/or feed law; and
a mechanically actuatable spray head.

27. The system according to claim 26,
wherein the spray head comprises an actuation section operatively cooperating with the actuating section of the transmission element, and/or
wherein the actuation section is linearly guided at the spray head, and wherein the spray head is configured such that a puff is triggerable by means of substantially linear displacement of the actuation section.

28. The system according to claim 27, wherein the actuation section is operatively cooperating with the pressure element.

29. The system according to claim 26,
wherein the container comprises an engagement portion engaging with a corresponding engagement portion of the apparatus, and/or
wherein the mount is configured so as to prevent the spray head from yielding when the actuation section is actuated by the actuating section of the transmission element.

30. The system according to claim 29, wherein the container and the mechanically actuatable spray head form a liquid reservoir which is non-destructively releasably mounted to the apparatus.

31. The system according to claim 29, wherein the engagement portion of the apparatus comprises a cavity provided at the mount.

32. The system according to claim 29, wherein the engagement portion of the container comprises a projection at least partially circumferentially surrounding the container.

33. The system according to claim 29, wherein the mount engages around an engagement portion of the liquid reservoir.

34. The system according to claim 26, wherein the spray head comprises a nozzle configured for dispensing an amount of liquid in a spray cone with an aperture angle such that a diameter of the amount of liquid dispensed by the liquid reservoir is substantially at least equal to a distance between chain links of a chain conveyor, a pitch of a spiral conveyor, or a distance between carriers of a cable conveyor when impinging on the conveyed animal feed.

* * * * *